US011307904B2

(12) United States Patent
McLean et al.

(10) Patent No.: US 11,307,904 B2
(45) Date of Patent: Apr. 19, 2022

(54) CONFIGURABLE PERIPHERALS

(71) Applicant: ATI TECHNOLOGIES ULC, Markham (CA)

(72) Inventors: Michael McLean, Markham (CA); Philip Ng, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/224,378

(22) Filed: Dec. 18, 2018

(65) Prior Publication Data

US 2020/0192721 A1 Jun. 18, 2020

(51) Int. Cl.
*G06F 9/50* (2006.01)
*G06F 9/4401* (2018.01)
*G06F 15/78* (2006.01)

(52) U.S. Cl.
CPC .......... *G06F 9/5061* (2013.01); *G06F 9/4411* (2013.01); *G06F 9/5005* (2013.01); *G06F 15/781* (2013.01)

(58) Field of Classification Search
None
See application file for complete search history.

(56) References Cited

U.S. PATENT DOCUMENTS

| | | | |
|---|---|---|---|
| 7,849,310 B2 | 12/2010 | Watt et al. | |
| 8,209,514 B2* | 6/2012 | Kisel | G06F 3/0613 711/173 |
| 8,893,267 B1* | 11/2014 | Sathe | G06F 21/31 711/153 |
| 8,904,400 B2* | 12/2014 | Kisel | G06F 9/5011 718/104 |
| 2014/0297919 A1* | 10/2014 | Nachimuthu | G11C 14/009 711/102 |
| 2015/0052325 A1 | 2/2015 | Persson et al. | |
| 2016/0182238 A1* | 6/2016 | Dewan | H04L 9/3242 713/171 |
| 2017/0185538 A1* | 6/2017 | Khan | G06F 21/88 |
| 2017/0293451 A1* | 10/2017 | Pan | G06F 9/50 |
| 2019/0042229 A1* | 2/2019 | Kotary | G06F 8/654 |

* cited by examiner

*Primary Examiner* — Ryan D. Coyer (57) ABSTRACT

A system-on-chip (SOC), includes a memory, a partition access module coupled to the memory, a partition requesting unit coupled to the partition access module, and a first input-output (IO) device coupled to the partition access module. The partition access module creates a first partition of the SOC. The first partition includes a first portion of a first processor, the first IO device, and a first portion of the memory. Based upon a partition request, the partition access module repartitions the SOC to create a dynamic partition. The dynamic partition includes the first portion of the first processor, the first input-output (IO) device, the first portion of the memory, and a second IO device not included in the first partition.

21 Claims, 4 Drawing Sheets

PARTITION ACCESS MODULE 300

PARTITION ACCESS TABLE 302

| REQUESTOR ID 305 | PARTITION NUMBER 310 | PARTITION AUTHORITY 315 | PARTITION DEVICES 320 | DYNAMIC PARTITION ADJUSTMENT 325 | DYNAMIC PARTITION NUMBER 330 | CREATED PARTITION 335 | CREATED PARTITION NUMBER 340 |
|---|---|---|---|---|---|---|---|
| | | | | | | | |
| | | | | | | | |
| | | | | | | | |

FIG. 4

CONFIGURABLE PERIPHERALS

BACKGROUND

System-on-chip (SOC) devices utilize peripherals to accomplish many tasks, such as, for example, graphical processing, network interfacing, or disk controlling to retrieve data from massive storage devices. For SOCs with certain usage models and varying platform designs, the CPU and peripherals may require different combinations of common system resources. The use of different combinations of common system resources for various tasks by the SOC or other I/O devices promotes efficiency of the processing system. However, dedicating a set of resources to each CPU or peripheral may lead to an increased cost in the design of the overall system when the system resources are not simultaneously required by each device. Thus, there exists a need for an improved way to allocate system resources for varying platform designs that reduces the total amount of common resources.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for partitioning a system-on-chip (SOC) that is located on a computing device into a plurality of partitions. The SOC includes a platform security processor (PSP) with a partition access module configured to partition the SOC into the plurality of partitions. The SOC includes a memory, a partition access module coupled to the memory, a partition requesting unit coupled to the partition access module, and a first input-output (IO) device coupled to the partition access module. The partition access module creates a first partition of the SOC. The first partition includes a first portion of a first processor, the first IO device, and a first portion of the memory. Based upon a partition request, the partition access module repartitions the SOC to create a dynamic partition. The dynamic partition includes the first portion of the first processor, the first input-output (IO) device, the first portion of the memory, and a second IO device not included in the first partition.

Figure 1:
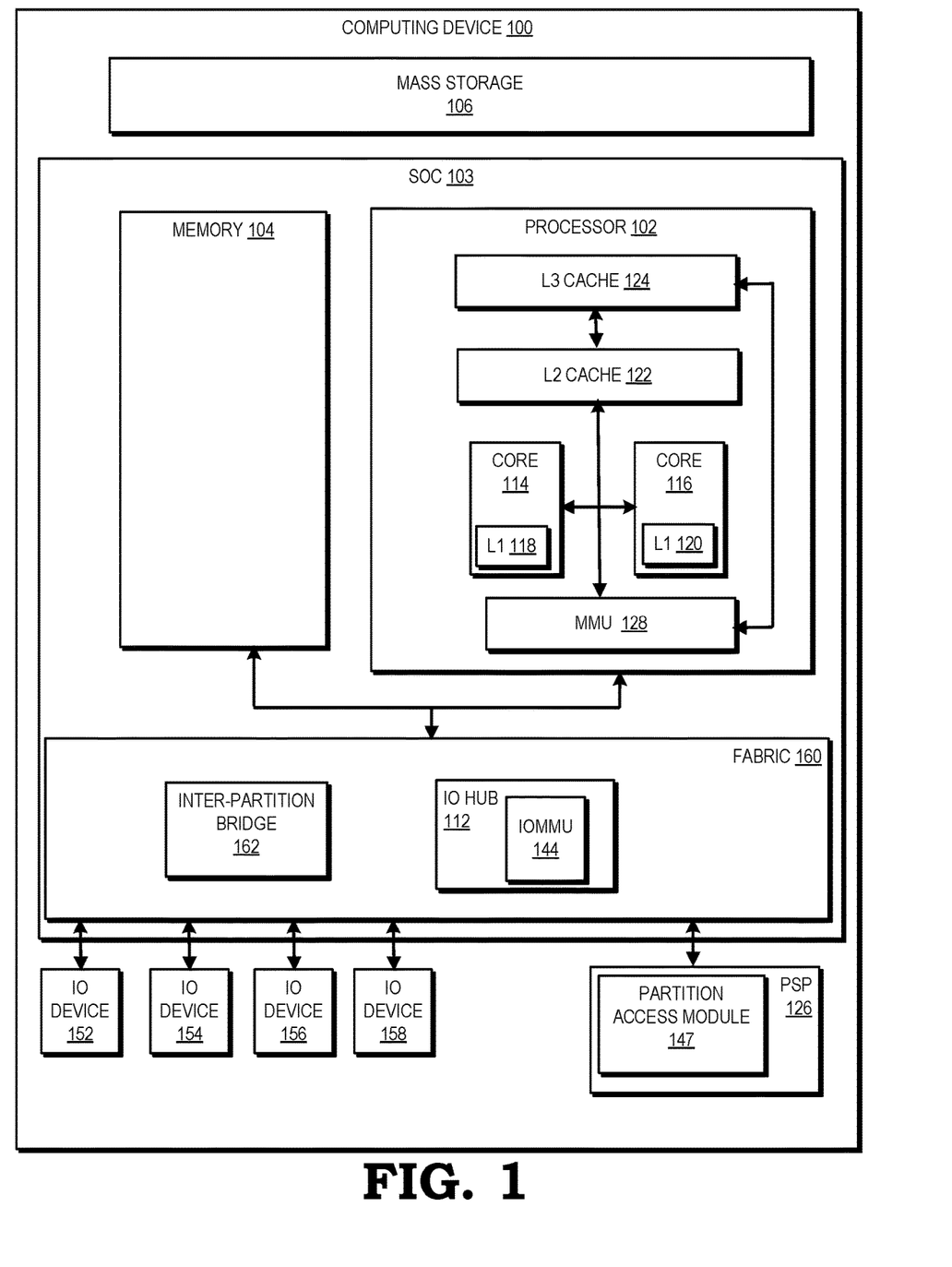
FIG. 1 is a block diagram illustrating a computing device in accordance with some embodiments.

FIG. 1 illustrates a computing device 100 in accordance with some embodiments. Computing device 100 includes a system-on-chip (SOC) 103, a mass storage 106, a platform security processor (PSP) 126, an input-output device 152, an input-output device 154, an input-output device 156, and an input-output device 158 (hereinafter, input-output (IO) devices 152-158). SOC 103 includes a processor 102, a memory 104, and "a communication fabric or, simply, fabric 160". In various embodiments, the components of SOC 103 may be integrated onto a single semiconductor substrate as an integrated circuit chip. Fabric 160 includes an input-output (IO) hub 112 and an inter-partition bridge 162. Input-output hub 112 includes an input-output memory management unit (IOMMU) 144. PSP 126 includes a partition access module 147.

Processor 102 is a functional block that performs computational operations in SOC 103 of computing device 100. Processor 102 includes two cores 114-116, each of which includes one or more computational mechanisms such as central processing units (CPUs), graphics processing units (GPUs), embedded processors, application specific integrated circuits (ASICs), and/or other computational mechanisms. Processor 102 also includes cache memories (or caches) that are used for locally storing data and instructions that are used by cores 114-116 for performing computational operations. As can be seen in FIG. 1, the caches in processor 102 include level-one (L1) caches 118-120 (L1 118 and L1 120) in each of cores 114-116. Each L1 cache includes memory circuits such as one or more of static random access memory (SRAM), dynamic random access memory (DRAM), double data rate synchronous DRAM (DDR SDRAM), and/or other types of memory circuits for storing data and instructions for use by the corresponding core 114-116, as well as control circuits for handling accesses of the data and instructions that are stored in the memory circuits. Processor 102 additionally includes a shared level-two (L2) cache 122 that includes memory circuits such as one or more of SRAM, DRAM, DDR SDRAM, and/or other types of memory circuits for storing data and instructions for use by both cores 114-116, as well as control circuits for handling accesses of the data and instructions that are stored in the memory circuits. Processor 102 further includes a shared level-three (L3) cache 124 that includes memory circuits such as one or more of SRAM, DRAM. DDR SDRAM, and other types of memory circuits for storing data and instructions for use by both cores 114-116, as well as control circuits for handling accesses of the data and instructions that are stored in the memory circuits.

Memory 104 is a memory in SOC 103 of computing device 100 (e.g., a "main" memory), and includes memory circuits such as one or more of DRAM, DDR SDRAM, non-volatile random access memory (NVRAM), and/or other types of memory circuits for storing data and instructions for use by functional blocks in computing device 100, as well as control circuits for handling accesses of the data and instructions that are stored in the memory circuits.

In some embodiments, computing device 100 includes a mass-storage device, mass storage 106, such as a high-capacity semiconductor memory (a non-volatile semiconductor memory such as a flash memory, an NVRAM, etc.), a disk drive (hard drive, etc.), an optical drive, etc. that stores data and instructions for use in computing device 100. In the described embodiments, mass storage 106 holds data and instructions that are acquired and stored in memory 104 for subsequent use by functional blocks in computing device 100.

Memory management unit (MMU) 128 is a functional block that handles memory access requests. When data and instructions are to be accessed by a functional block in processor 102 (i.e., read, written, checked/verified, deleted, invalidated, etc by core 114 or another functional block), the functional block sends a memory access request to memory management unit 128. Memory management unit 128 then sends a corresponding request to one or more of L2 cache 122, L3 cache 124, and memory 104 for satisfaction/resolution of the memory access request. For example, if data is to be retrieved based on the memory access request, memory management unit 128 may acquire the data from L2 cache 122, L3 cache 124, or memory 104 (or mass storage 106, should the data not be present in one of L2 cache 122, L3 cache 124, or memory 104) and forward the data to the requesting functional block.

IO hub 112 is an input-output hub that performs operations for interfacing between memory 104, PSP 126, and IO devices (e.g., IO devices 152-158) and other functional blocks in computing device 100 (e.g., processor 102). For example, in some embodiments, input-output memory management unit (IOMMU) 144 in IO hub 112 performs operations to enable IO devices to access memory 104. In these embodiments, when data and instructions are to be accessed by an IO device in memory 104 (i.e., read, written, checked/verified, deleted, invalidated, etc.), the IO device sends a memory access request (e.g., a direct memory access request or DMA) to IOMMU 144. IOMMU 144 then sends a corresponding request to memory 104 for satisfaction/resolution of the memory access request. For example, if data is to be retrieved based on the memory access request, IOMMU 144 may acquire the data from memory 104 (or mass storage 106, should the data not be present in memory 104) and forward the data to the requesting IO device.

Input-output (IO) devices 152-158 are devices or functional blocks that perform, in the course of corresponding device operations, accesses (e.g., reads, writes, copies, invalidations, etc.) of data and/or instructions in memory 104. For example, IO devices 152-158 may include network interface devices, disk controllers, devices coupled to corresponding wired or wireless buses or interfaces (e.g., a Peripheral Controller Interface Express (PCIe) bus, a Universal Serial Bus (USB), a WiFi device, etc.), GPUs, etc. The particular operations performed by each of IO devices 152-158 depends on the nature of each IO device. For example, IO device 152 may be a disk controller and may retrieve data from a disk (such as mass storage 106) and write data into memory 104 or vice versa. As another example, IO device 154 may be a network interface device and may store data received via a network in memory 104 or acquire data from memory 104 to be transmitted in a packet, data unit, etc. to a receiving device over the network. As another example, IO device 156 may be a GPU and perform operations for rendering graphics or other information for display and/or may perform general-purpose computing operations (e.g., matrix processing operations, operations off-loaded from one of cores 114-116, etc.).

Computing device 100 additionally includes platform security processor (PSP) 126, which includes partition access module 147 for partitioning SOC 203 into one or more partitions. Platform security processor 126 comprises a processor core, an ASIC, and/or other functional block(s) for performing security and partitioning operations in computing device 100. Generally, platform security processor 126 is known to be secure against malicious or erroneous behavior of hardware and software entities, and thus can be used within computing device 100 for securing operations that are susceptible to such behavior. For example, platform security processor 126 may perform operations associated with enabling a trusted execution environment in computing device 100, such as performing encryption operations (e.g., key generation, encryption/decryption of data, etc.), registration and/or authentication of hardware and software entities, etc.

Partition access module 147 of PSP 126 is configured to perform operations for partitioning SOC 103 into two or more partitions. A partition is a portion of computing device 100 or SOC 103 that contains at least one device of IO devices 152-158, a portion of processors 102, and a portion of memory 104 that are configured to function independent of the portion outside of the partition of computing device 100 or SOC 103. In various embodiments, a main partition is the portion of computing device 100 or SOC 103 that is the portion outside the partition or partitions of computing device 100 or SOC 103. In various embodiments, for example, a partition includes a primary device that includes an operating system, such as, for example, processor 102, and a secondary device, such as, for example, an accelerator composed of, for example, a plurality (i.e., at least two) of IO devices from IO devices 152-158, and/or at least an allocated portion of memory 104. In one embodiment, because the primary device has its own operating system and has been assigned a dedicated partition, it is able operate the partition independent of the devices outside of its own partition. Partition access module 147 contains partitioning logic and/or partitioning firmware that is configured to read, for example, fuses located in SOC 103 or a partition table located in partition access module 147, that allow partition access module 147 to partition various IO devices 152-158, memory 104, and/or processor 102.

In various embodiments, the dynamic partitioning of SOC 203 includes an initial partitioning and a subsequent partition of SOC 203. The initial partitioning of SOC 203 is accomplished by reading the fuse settings of partition firmware located in platform security processor 126. Subsequent partitioning of SOC 103 is accomplished using partition requests from, for example, processor 102 or IO devices 152-158 coupled to fabric 160 and partition access module 147. Partition access module 147 validates partition requests that arrive after the initial partitioning using the partition table located internal to partition access module 147 in order to allow SOC 103 to be dynamically partitioned by partition access module 104. Based on the validation, partition access module 147 dynamically adjusts a partition, creates a new partition, or allows access to a previously created partition In various embodiments, the use of partitions in SOC 203 allows the device requesting the partition (i.e., requestor device) primary or exclusive access to the IO devices or processing devices located inside or assigned to each partition of SOC 203.

Figure 2:
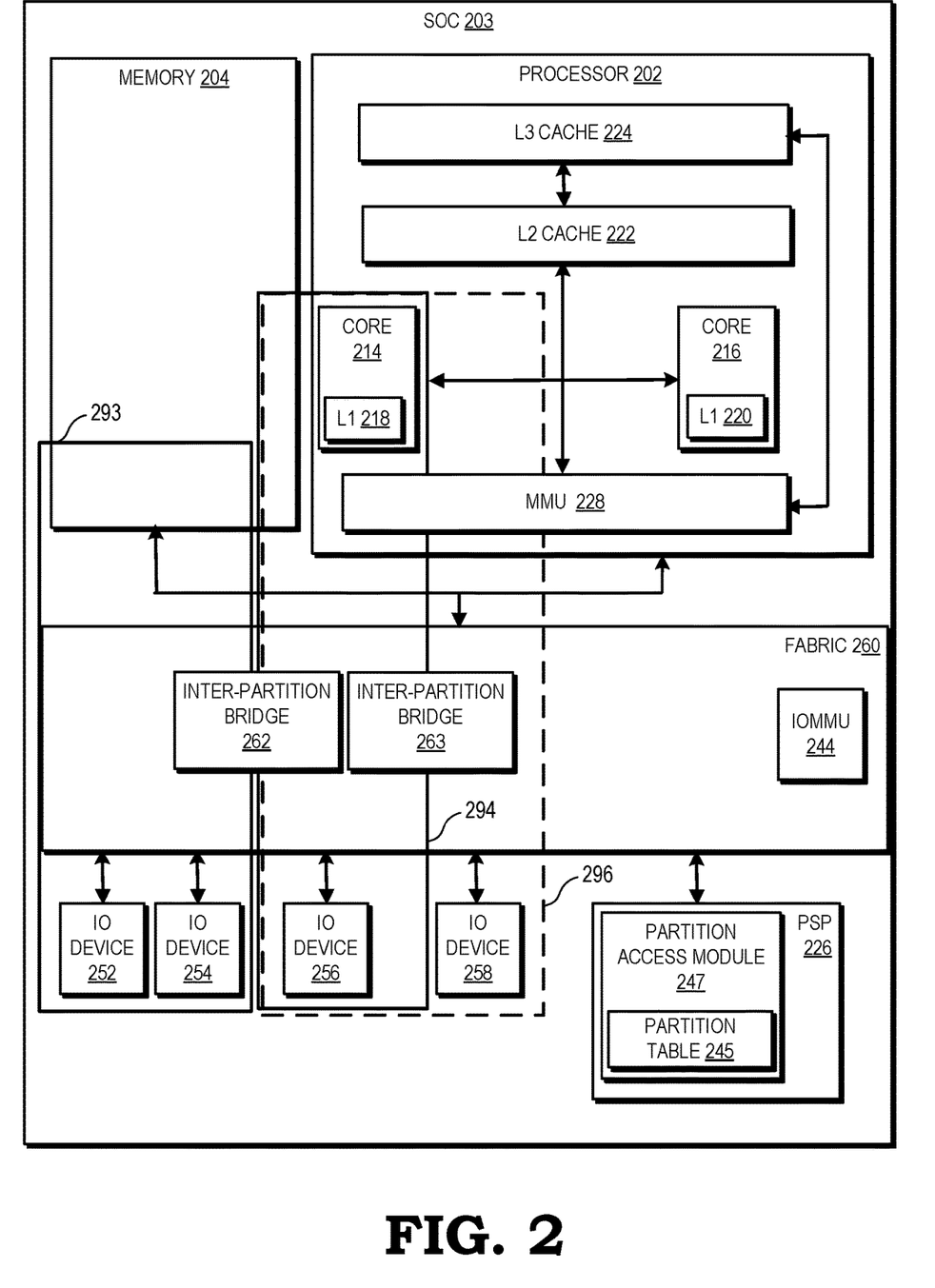
FIG. 2 is a block diagram illustrating an SOC in accordance with some embodiments.

FIG. 2 presents a block diagram of an SOC 203 undergoing dynamic partitioning in accordance with some embodiments. SOC 203 includes a processor 202, a memory 204, a fabric 260, an input-output device 252, an input-output device 254, an input-output device 256, an input-output device 258 (hereinafter, IO devices 252-258), a partition 293, a partition 294, a dynamically-adjusted partition 296, and a PSP 226. Memory 204, processor 202 and IO devices 252-258 are coupled to each other via fabric 260. In various embodiments, the components of SOC 203 may be integrated onto a single semiconductor substrate as an integrated circuit chip. Fabric 260 includes an input-output memory management unit (IOMMU) 244, an inter-partition bridge 262. PSP 226 includes a partition access module 247. Partition access module 247 includes a partition table 245. In some embodiments, partition 293 is coupled to partition 294 via inter-partition bridge 262. In various embodiments, a main partition, i.e., the portion of SOC 203 outside of the partition/s (e.g., partition 292 and/or partition 294) is coupled to the partition/s via an inter-partition bridge. In various embodiments, for example, the main partition is coupled to partition 294 via an inter-partition bridge 263. In various embodiments, inter-partition bridge 262 allows communication to occur between partition 293 and partition 294. In various embodiments, inter-partition bridge 263 allows communication to occur between partition 294 and the main partition.

In various embodiments, inter-partition bridge 262 is configured to prevent devices and software external to a first partition from knowing the contents, i.e., devices and software, that are located within a second partition. That is, I/O devices and software located within a second partition are prevented from becoming aware of the resources (e.g., I/O devices, MMIO and memory) within the first partition by inter-partition bridge 262. The I/O devices located in the first partition can only "see" the resources exposed by inter-partition bridge 262.

In various embodiments, in order to dynamically partition SOC 203, SOC 203 undergoes an initial partitioning that occurs during boot-up time of SOC 203 and a subsequent partitioning that occurs during runtime of SOC 203. The initial partitioning of SOC 203 partitions IO devices 252-258, memory 204, and processor 202 into, for example, partition 293 and partition 294. The subsequent partitioning of SOC 203 allows for the dynamic adjustment of the initial partitions to create a dynamically adjusted partition (e.g., dynamically adjusted partition 296) or the creation of new partitions that include other IO devices 252-258. In various embodiments, additional partitions may be created, adjusted, or accessed in SOC 203 based upon design preferences.

In one embodiment, SOC 203 is initially partitioned into partition 293 and partition 294 using fuses that are set during the manufacturing process of SOC 203. In various embodiments, the fuses are set or programmed upon fabrication or system integration. The fuses that are set during the manufacturing process dictate the initial partitions of SOC 203 and are programmed by the manufacturer during the manufacturing process of SOC 203. In another embodiment, SOC 203 is initially partitioned using partition firmware that is loaded by the manufacturer during the manufacturing process of SOC 203, where the partition firmware dictates the initial partitions of SOC 203 and is controlled by the manufacturer of SOC 203. In another embodiment, SOC 203 is partitioned by partition firmware that is uploaded by the end user of SOC 203, where the end user of SOC 203 controls the initial partition configurations of SOC 203.

Subsequent partitioning of SOC 203 occurs after the initial partitioning of SOC 203, i.e., during runtime of SOC 203, and utilizes a partition request from, for example, processor 202 or at least one IO device of IO devices 252-258, in combination with a partition table 245 to dynamically adjust or create partitions. Partition table 245 is a table located in partition access module 247 that, in addition to allowing the validation of a partition request, enumerates the plurality of IO devices 252-258, memory 104, and processor 202 that are associated with each partition. The partition requests are utilized by partition firmware located in partition access module 247 to create, adjust, or access the partitions. The partition firmware is uploaded at boot-up time prior to the initial partitioning and/or reloaded at runtime during the subsequent partitioning depending on whether SOC 203 is designed to allow processor 202 and/or an IO device/s of IO devices 252-258 to issue partition requests.

During operation of SOC 203, at system boot time, the partition firmware is loaded into partition access module 247 of PSP 226 from external flash. In various embodiments, partition firmware is firmware that is configured to read a partition configuration dictated by fuses that are set at production of SOC 203. That is, fuses associated with SOC 203 contain the partition configurations for SOC 203 and the partition firmware is configured to read the fuses that have the partition configurations embedded therein. In another embodiment, the partition firmware is configured to partition SOC 203 into partition configurations dictated by the partition firmware and includes the instructions for partitioning SOC 203.

After loading the partition firmware into partition access module 247, partition access module 247 validates the partition firmware received from external flash. For the case where the fuses have been set at production, the partition firmware reads the fuses during the boot-up process of SOC 203 and analyzes the fuses in order to determine the appropriate partitioning of SOC 203. In various embodiments, the fuse settings serve as an indication of the number of partitions and the partition size, i.e., the IO devices 252-258 or portions of IO devices 252-258, portions of memory 204, and/or portions of processor 202 that are to be assigned to each partition. Partition table 245 of partition access module 247 is updated to include the IO devices 252-258 or portions of IO devices 252-258, memory 204 or portions of memory 204, and/or processor 202 or portions of processor 202 that are to be assigned to each partition.

Partition access module 247 partitions SOC 203 into the one or more partitions by programming partition table 245 based on the fuse settings or the partition firmware settings. For example, the fuse settings or partition firmware may instruct partition access module 247 to partition SOC 203 to create partition 293 and partition 294. In various embodiments, the fuse settings and/or partition firmware are configured such that partition 293 is assigned IO device 252, IO device 254, and a portion of memory 204, and partition 294 is assigned IO device 256, IO device 258, and processor 202. In various embodiments, partitioning SOC 203 into partition 293 and partition 294 allows the IO devices 252-258 or processor 202 located within each partition to be the only devices within the partition to access the functionality of each device assigned to each partition based on whether each partition (i.e., the IO devices 252-258, portion of memory 104, and processor 202 located in each partition) is activated for primary access or exclusive access of the partition. In various embodiments, primary access is considered access where the requestor device has priority to use the devices in the partition over other devices with a lower priority that may request access to the devices in the partition. Further, a requestor device with primary access may be overruled by other devices that have higher priority to the devices in the partition. Exclusive access is access where no other device has higher priority to access the devices in the requested partition. For example, for processor 202 of partition 294, while partition 294 is active, processor 202 is able conduct processing operations exclusively with IO devices 252-258 and memory 104 that are assigned to partition 294, i.e., IO device 256 within partition 294. Similarly, IO devices 252-254 are able conduct processing operations primarily with other IO devices 252-254 and memory 204 that are assigned to partition 293. In various embodiments, resources located within a partition are used exclusively within the partition unless exposed via inter-partition bridge 262. Thus, partitioning SOC 203 into partitions, such as, for example, partition 293 and partition 294, allows the dedicated use of IO devices 252-258, memory 104, and processor 202 located in the partition, thereby improving processing speed for the operations that are occurring within each partition of SOC 203.

As stated previously, subsequent partitioning, which includes the dynamic partitioning of, for example, partition 293 or partition 294 created in SOC 203, occurs during system runtime. During system runtime, a requestor device, such as, for example, processor 202, makes a partition request to partition access module 247 of PSP 226. Partition access module 247 validates the partition request and determines whether processor 202 seeks to dynamically reconfigure its current partition (e.g., partition 294), create a new partition, or access an already existing partition. In one embodiment, when processor 202 seeks to dynamically adjust the size of the partition, e.g., adjusting the size of partition 294 to include an additional IO device 258, partition access module 247 of PSP 226 repartitions SOC 203 by reprogramming partition table 245 to include IO device 258 based on the partition request. For example, partition 294 of partition table 245 is adjusted to include IO device 258 and partition 294 becomes dynamically adjusted partition 296. Once dynamically adjusted partition 296 has been created, PSP 226 notifies the requestor device, e.g., processor 202, that the partitioning operation is complete and processor 202 has primary or exclusive access to IO devices 256-258 located in dynamically adjusted partition 296.

After PSP 226 has notified the requestor device that the dynamically adjusted partition 296 has been created, processor 202 software enumerates or re-enumerates partition table 245 of SOC 203 to detail the addition of the device to the dynamically adjusted partition 296. By dynamically partitioning SOC 203, the requestor device is now able to have primary or exclusive access to the IO devices 252-258 and memory 104 located within dynamically adjusted partition 296.

In various embodiments, when, for example, an external IO device of IO devices 252-258 seeks to create or dynamically adjust a partition 293 or a partition 294 of SOC 203, enhanced security features are added to ensure safe partitioning. During operation, an IO device of IO devices 252-258, such as, for example, IO device 252, sends a partition request to partition access module 247 to dynamically adjust a partition, attain access to a partition that IO device 252 is not assigned to, or create a new partition. In various embodiments, the partition request, in addition to including a device ID (which includes bus, device, and function fields), includes a partition access tag, a secured partition access tag, a partition level tag, and a security partition level tag. Partition access module 247 receives the partition request from, for example, IO device 252 and analyzes or validates the partition request to determine whether the requesting device has permission to access a partition, create a new partition, or dynamically adjust a partition.

To validate the partition request, partition access module 247 compares the requestor's device ID to requestor IDs listed in partition table 245 located in, for example, partition access module 247. When the requestor device's device ID is a match with a requestor ID in partition table 245, partition access module 247 determines whether the requestor device seeks to dynamically adjust its current partition to include another device, create a new partition, or access a partition. When the requestor device seeks to access adjust its current partition to include another device, i.e., the destination of the partition request is within the same partition as the requestor device, partition access module 247 repartitions SOC 203 by reprogramming partition table 245 according to the partition configuration dictated based on the partition request.

In various embodiments, when the requestor device seeks to create a new partition, partition access module 247 determines whether the requestor device has the authority to create a new partition by checking the partition authority tag in partition table 245. When the requestor device has authority to create a new partition, partition access module 247 creates a new partition with the devices specified for the new partition by the requestor device in the partition request. As a result, partition access module 247 has created a partition of which requestor device has primary or exclusive use of the devices in the partition.

In various embodiments, when the requestor device seeks to access a partition of which the requestor device is not a part of, partition access module 247 determines whether the requestor device has to authority to access the partition. When the requestor device has authority to access the partition, partition access module 247 determines whether the requestor device has a priority level greater than the devices in the partition it seeks to access. When the requestor device does not have a greater authority then all devices in the partition, then the partition request is aborted. When the requestor device does have a greater partition authority then all the devices in the partition, the requestor device accesses the partition and has dedicated use of the devices located in the partition.

In various embodiments, when the requestor device's device ID does not match a requestor ID in partition table 245, rather than abort the partition request, partition access module 247 may determine whether the requestor device meets security requirements to be allowed access to the partition, dynamically adjust the partition, or create a new partition. In various embodiments, to determine whether the requestor device meets the security requirements for validation, PSP 226 includes security firmware that, for example, upon boot-up or runtime of SOC 203, performs the security access operations that allows partition access module 247 of SOC 203 to make security partition determinations. In some embodiments, platform security processor 226 performs at least some of the operations described herein for determining secured access by IO devices 252-258 to create partitions, access partitions, or dynamically adjust partitions of SOC 203. That is, platform security processor 226 is configured to secure SOC 203 against malicious or erroneous behavior of hardware and software entities, and thus can be used within SOC 203 for securing operations related to IO devices that are susceptible to such behavior. For example, platform security processor 126 may perform operations associated with enabling a trusted execution environment in SOC 203, such as performing encryption operations (e.g., key generation, encryption/decryption of data, etc.), registration and/or authentication of hardware and software entities, etc.

In one embodiment, for example, IO device 256 may only have access to USB devices within its partition (partition 294) and seek to have access to a PCI express controller located external to partition 294. For this embodiment, partition 294 may include, for example, IO device 252, processor 202, a dedicated portion of memory 204, but not a PCI express controller. IO device 252 may include, for example, a central processing unit (CPU) that maintains an operating system, where the operating system requires access to a PCI express controller that is external to IO device 252 in order to facilitate the use of PCI express. Instead of placing, for example, the PCI express controller inside IO device 252 and having the external resources dedicated to IO device 252, partition access module 247 dynamically adjusts partition 294 to include the PCI controller, which allows IO device 252 access to the PCI controller associated with IO device 254 in order to communicate with other IO devices using PCI express. In some embodiments, the PCI express controller has multiple ports and becomes a shared PCI express controller, i.e., assigned to more than one partition where IO device 252 is assigned a portion of the PCI express controller. As a result of the dynamic partitioning performed by partition access module 247 to include the PCI express controller, IO device 252 has access to the PCI express controller to connect to IO devices attached to a PCI express bus.

Figure 3:
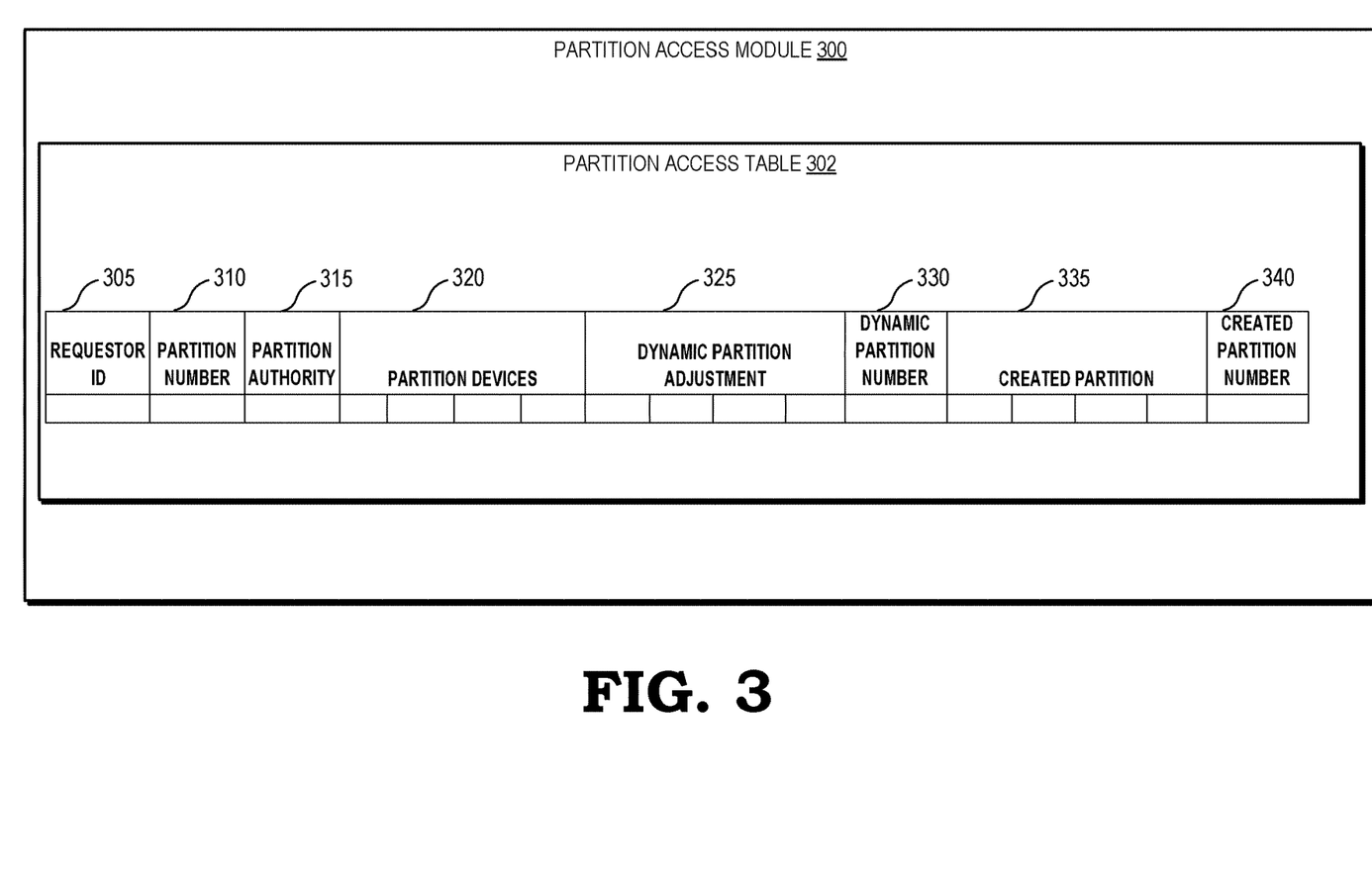
FIG. 3 is a block diagram illustrating a partition table in accordance with some embodiments.

FIG. 3 is a block diagram of partition access module 300 including a partition access table 302 for partitioning an SOC in accordance with some embodiments. Partition access table 302 includes a requestor device ID 305 (requestor ID 305), a partition number 310, a partition authority tag 315, a partition devices 320, a dynamic partition adjustment 325, and a dynamic partition number 330. In addition to general partition size and device information, partition table 302 provides indication of whether the requestor device has permission to access a partition, create a partition, or dynamically adjust a partition.

In various embodiments, the requestor ID 305 is the device ID of the device issuing the partition request, which includes bus, device, and function fields. In various embodiments, the requestor ID is an identifier used within the SOC that may be, for example, a PCI based bus/device/function requestor ID. In various embodiments, the requestor ID is used to track and assign partition numbers and partition devices associated with the requestor device, in addition to the security authorization status of the requestor ID and any new partitions that have been created or partitions that may be accessed by the requestor device.

The partition number 310 is a number that has been assigned to the partition that the requestor device is associated with. For example, the requestor device may be associated with partition number 1, which includes a first device, a second device, and a third device (i.e., device ID 1, a device ID 2, and a device ID 3).

The partition authority 315 is a number that indicates the authority level of the requestor device. For example, a requestor device with a partition authority number of 0 does not have authority to create a partition or dynamically adjust a partition, a requestor device with a partition authority of 1 has the authority to dynamically adjust a partition, but not create a new partition, and requestor device with a partition authority of 2 has the authority to create a partition and dynamically adjust a partition.

Partition devices 320 indicates the devices that are in the partition that is associated with the requestor device's device ID. That is, partition devices 315 includes the device numbers of all the devices in the partition associated with the requestor device. In one embodiment, partition devices 315 is updated immediately upon boot-up of SOC 203 with the devices indicated by the fuse settings or partition firmware.

Dynamic partition adjustment 320 indicates the devices that are being added to dynamically adjust the initial partition associated with the requestor device. For example, if device ID 4 is being added to adjust partition number 1, then dynamic partition adjustment 320 is updated to include the added device ID.

The dynamic partition number 330 is the partition number assigned to the dynamically adjusted partition of SOC 203. The dynamic partition number 330 is enumerated or updated when the partition operation is complete. In various embodiments, partition access table 302 may also include a created partition column and a created partition number column. The created partition 335 includes the devices that have been added to a new partition created by the requestor device. The created partition number 340 includes a new partition number that has been assigned to the newly created partition.

Figure 4:
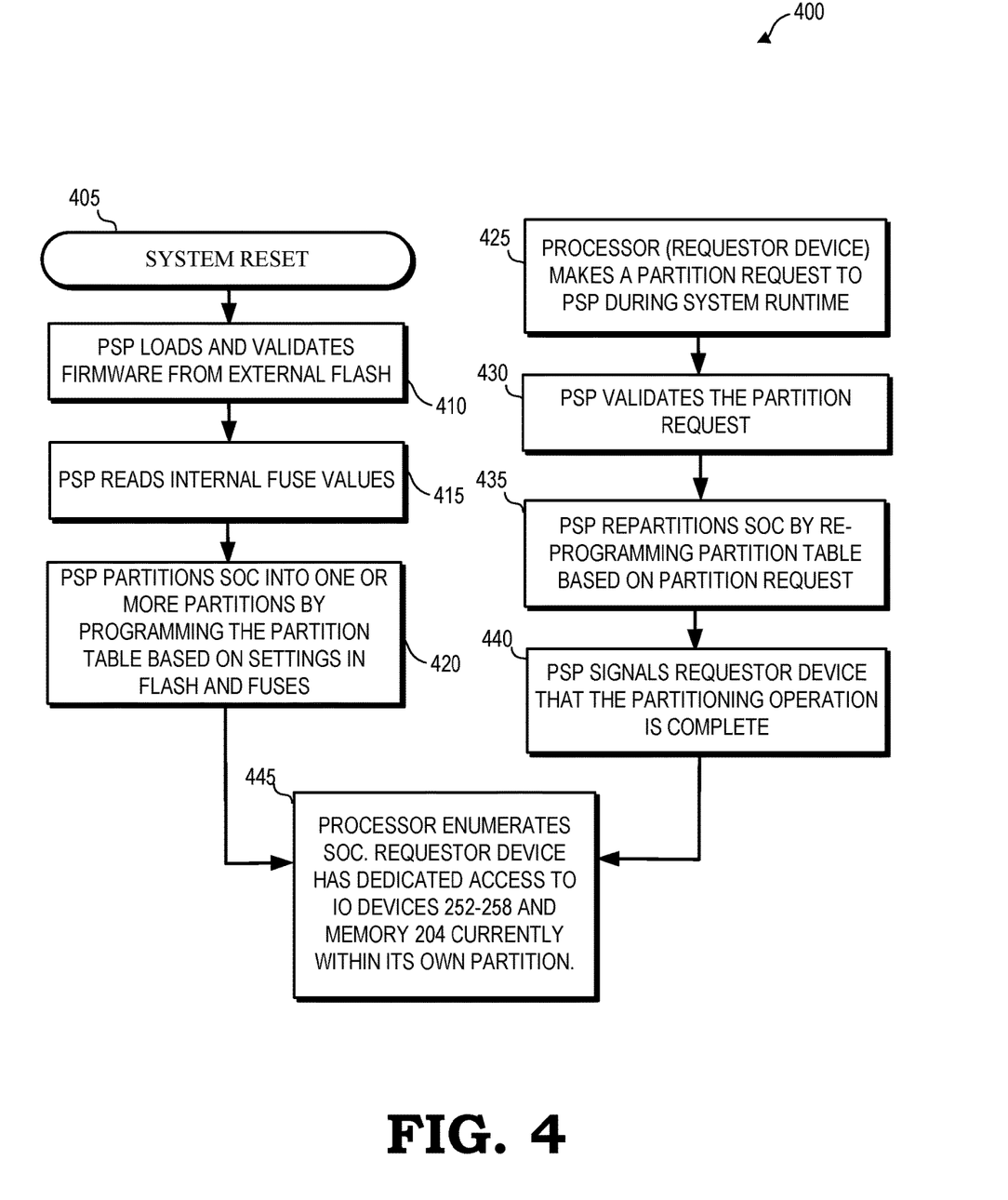
FIG. 4 is a flow diagram illustrating a method for partitioning an SOC in accordance with some embodiments.

FIG. 4 illustrates a flow diagram of a method 400 of partitioning an SOC in accordance with some embodiments. For purposes of description, the method 400 is described with respect to an example implementation at the partition access module 247 of FIG. 2.

At block 405, method 400 begins with a system reset of SOC 203. At block 410, during boot-up time, PSP 226 loads and validates partition firmware from external flash. At block 415, PSP 226 reads internal fuse values from SOC 203. At block 420, PSP 226 partitions SOC 203 into one or more partitions by programming partition table 245 based on settings in the flash and fuses of SOC 203. At block 445, processor 202 enumerates SOC 203 and has dedicated access to IO devices 252-258 and memory 204 currently within its own partition.

At block 425, during system runtime, processor 202 makes a partition request to PSP 226. At block 430, PSP 226 validates the partition request. At block 435, PSP 226 repartitions SOC 203 by reprogramming partition table 245 based on the partition request. At block 440, PSP 226 signals processor 202 that the partitioning operation is complete. At block 445, PSP 226 re-enumerates SOC 203 and the requestor device, e.g., processor 202, has primary access to IO devices 252-258 and memory 204 that are currently located within the requestor device's partition. In one embodiment, at block 445, the requestor device has exclusive access to IO devices 252-258 and memory 204 that are currently located within the requestor device's partition.

In some embodiments, the apparatus and techniques described above are implemented in a system including one or more integrated circuit (IC) devices (also referred to as integrated circuit packages or microchips), such as the computing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
creating a first partition of a system-on-chip (SOC), the first partition including a first portion of a first processor, a first input-output (TO) device, and a first portion of a memory;
receiving a partition request at a partition access module from a second IO device not included in the first partition;
based on the partition request, determining a priority level of the second IO device for accessing the first processor and the first portion of the memory; and
based on the partition request and the priority level of the second IO device, repartitioning the SOC to create a dynamic partition, the dynamic partition including the first portion of the first processor, the first IO device, the first portion of the memory, and the second IO device not included in the first partition.

2. The method of claim 1, wherein:
the SOC is repartitioned by reprogramming a partition table based on the partition request.

3. The method of claim 1, wherein:
the first partition is created during boot time using at least one of a plurality of fuses located in the SOC.

4. The method of claim 3, further comprising:
validating the partition request, in order to create the dynamic partition, using a partition table.

5. The method of claim 4, further comprising:
prior to creating the first partition, loading partition firmware into the partition access module.

6. The method of claim 5, further comprising:
after loading the partition firmware into the partition access module, reading a plurality of fuse values from the plurality of fuses of the SOC, wherein the plurality of fuses dictate a size of the first partition.

7. The method of claim 1, further comprising:
creating a second partition including a second portion of the memory, a third IO device not included in the first partition, and a fourth IO device not included in the first partition; and
using an inter-partition bridge to prevent the second partition from accessing the contents of the first partition.

8. The method of claim 1, wherein:
the partition access module signals to the dynamic partition that partitioning is complete after the repartitioning of the SOC.

9. The method of claim 1, wherein:
based on the repartitioning of the SOC, a partition requesting unit has primary access to the first portion of the first processor, the first IO device, the first portion of the memory, and the second IO device.

10. A system-on-chip (SOC), comprising:
a partition access module couplable to a memory;
a partition requesting unit coupled to the partition access module; and
a first input-output (TO) device coupled to the partition access module, wherein the partition access module creates a first partition of the SOC, the first partition including a first portion of a first processor, the first IO device, and a first portion of the memory, and based upon a partition request, the partition access module repartitions the SOC to create a dynamic partition, the dynamic partition including the first portion of the first processor, the first TO device, the first portion of the memory, and a second TO device not included in the first partition, the partition access module, based on the partition request, determines priority level of the second TO device for accessing the first processor and the first portion of the memory.

11. The SOC of claim 10, wherein:
the SOC is repartitioned by reprogramming a partition table based on the partition request.

12. The SOC of claim 10, wherein:
the first partition is created during boot time using at least one of a plurality of fuses located in the SOC.

13. The SOC of claim 10, wherein:
the partition request is validated in order to create the dynamic partition.

14. The SOC of claim 12, further comprising:
prior to creating the first partition, partition firmware is loaded into the partition access module.

15. The SOC of claim 14, further comprising:
after loading the partition firmware into the partition access module, reading a plurality of fuse values from the plurality of fuses of the SOC, wherein the plurality of fuses dictate a size of the first partition.

16. The SOC of claim 10, further comprising:
an inter-partition bridge, wherein the partition access module creates a second partition including a second portion of the memory, a third TO device not included in the first partition, and a fourth TO device not included in the first partition, and wherein the inter-partition bridge prevents the second partition from accessing the contents of the first partition.

17. The SOC of claim 11, wherein:
the partition access module signals to the dynamic partition that partitioning is complete after the SOC is repartitioned.

18. The SOC of claim 11, wherein:
based on the repartitioning of the SOC, the partition requesting unit has primary access to the first portion of the first processor, the first IO device, the first portion of the memory, and the second IO device.

19. A computing device, comprising:
a platform security processor couplable to a memory;
a processor coupled to the platform security processor; and
a first input-output (TO) device coupled to the platform security processor, wherein the platform security processor creates a first partition of a system-on-chip (SOC) of the computing device, the first partition including a first portion of a first processor, the first IO device, and a first portion of the memory, and based on a partition request, the platform security processor repartitions the SOC to create a dynamic partition, the dynamic partition including the first portion of the first processor, the first IO device, the first portion of the memory, and a second IO device not included in the first partition, the platform security processor, based on the partition request, determines a priority level of the second IO device for accessing the first processor and the first portion of the memory.

20. The computing device of claim 19, wherein:
the SOC is repartitioned by reprogramming a partition table based on the partition request.

21. The computing device of claim 19, wherein the platform security processor determines that a requestor device associated with the partition request meets security requirements to be allowed to dynamically adjust the first partition.

* * * * *

UNITED STATES PATENT AND TRADEMARK OFFICE
CERTIFICATE OF CORRECTION

PATENT NO. : 11,307,904 B2
APPLICATION NO. : 16/224378
DATED : April 19, 2022
INVENTOR(S) : Michael McLean and Philip Ng It is certified that error appears in the above-identified patent and that said Letters Patent is hereby corrected as shown below:

In the Claims

At Column 11 Line 60, please delete "TO" between "()" and insert --IO--

At Column 12 Line 45, please delete "TO" between "()" and insert --IO--

At Column 12 Line 53, please delete "TO" and insert --IO-- after "first" and before "device"

At Column 12 Line 54, please delete "TO" and insert --IO-- after "second" and before "device"

At Column 13 Line 12, please delete "TO" and insert --IO-- after "third" and before "device"

At Column 13 Line 13, please delete "TO" and insert --IO-- after "fourth" and before "device"

At Column 14 Line 3, please delete "TO" between "()" and insert --IO--

Signed and Sealed this
Seventh Day of February, 2023

Katherine Kelly Vidal
*Director of the United States Patent and Trademark Office*